United States Patent [19]

Cormack

[11] 4,246,116
[45] Jan. 20, 1981

[54] DEGREASER FREEBOARD CONTROL

[76] Inventor: Robert G. Cormack, 8137 Allport Ave., Santa Fe Springs, Calif. 90677

[21] Appl. No.: 86,702

[22] Filed: Oct. 22, 1979

[51] Int. Cl.³ .......................... B01D 3/02; B01D 11/00
[52] U.S. Cl. .................................................... 210/170
[58] Field of Search ................................. 202/168–170

[56] References Cited

U.S. PATENT DOCUMENTS 2,351,704 6/1944 Phillips et al. ........................ 202/170

Primary Examiner—Frank Sever

[57] ABSTRACT

A vapor degreaser with solvent tank, a liquid heated at the bottom of the tank to produce vapor, condensing coils at the wall of the tank defining a vapor level, and a condensate collector and return, with a freeboard or open space between the vapor level and the open top of the tank for insertion and removal of articles to be cleaned. Inserts are installed at each side of the interior of the tank at the freeboard level to increase the freeboard depth-to-width ratio to meet air pollution control requirements.

6 Claims, 4 Drawing Figures

DEGREASER FREEBOARD CONTROL

BACKGROUND OF THE INVENTION

This invention relates to vapor degreasers and in particular, to modifications for conventional degreasers to reduce air pollution possibilities and meet air pollution control requirements.

A conventional vapor degreaser utilizes a rectangular tank with a quantity of liquid solvent in the lower portion, which solvent is heated to produce vapor, typically by passing steam through coils in the lower portion of the tank. A vapor condenser is incorporated in the tank, typically in the form of a plurality of cooling coils around the interior of the tank. Vapor rising from the liquid level to the cooling coils is condensed at the coils, collected in condensate troughs or the like, and after separation of water, the solvent is returned to the bottom of the tank. The vapor level is defined by the condensing coils with most of the vapor in the tank being in the zone between the liquid level and the vapor level.

In use, the part to be cleaned is positioned in the tank in the vapor zone between the liquid and vapor levels. The part may also be sprayed with liquid solvent if desired. Typical vapor degreasers and their use are shown in the Vapor Degreasing Handbook published by Electro Chemicals Division, Diamond Shamrock Corporation, publication EC-S-51a.

While most of the vapor is condensed at the vapor level, some of the vapor escapes upward through the open top of the tank. Various steps are being taken to reduce the amount of vapor which does escape, since this contributes to undesirable air pollution. The freeboard ratio is defined as the ratio of the depth of the tank between the open top and the vapor level to the width at the open top, and this freeboard ratio is one of the parameters which must be maintained within certain limits in order for a vapor degreaser to meet some present day air pollution control requirements.

By way of example, a typical vapor degreaser tank may have an inside depth of 16½ inches and an inside width of 27 inches providing a freeboard ratio of 61%. However, some air pollution control requirements state that the freeboard ratio must be 75% or greater and many vapor degreasers of current design do not meet this requirement.

Therefore it is an object of the present invention to provide a modification for a vapor degreaser for increasng the freeboard ratio without otherwise affecting the construction and/or operation of the unit. A further object is to provide such a modification which is easily and inexpensively carried out with existing units and which can be accomplished in the field with a minimum of interruption to use in production.

Other objects, advantages, features and results will more fully appear in the course of the following description.

SUMMARY OF THE INVENTION

The present invention comprises a tank insert for use with a conventional vapor degreaser having a rectangular tank for a solvent, a condenser mounted at the wall of the tank defining a vapor level with a freeboard between the vapor level and the open top of the tank, a condensate collecting system for returning condensed solvent vapor to the liquid in the lower portion of the tank, and a heater for heating the liquid solvent. Tank inserts may be mounted at one or both sides of the tank and the insert has a substantially vertical wall extendng from adjacent the tank top to the vapor level, a spacer for positioning the insert wall inward from the tank wall thereby reducing the freeboard width, and a stop positioned between the insert wall and the tank wall blocking vapor flow upward between the walls. In the simplest form, a single generally horizontal member may serve as the spacer, the stop, and the support for the vertical wall of the insert.

In the preferred embodiment, the insert wall projects downward past the condensing coils terminating in the condensate collecting trough, with a plurality of apertures in the lower portion of the insert wall for vapor flow to the condensing coils or other condenser components.

DESCRIPTION OF THE PREFERRED EMBODIMENTS

Figure 1:
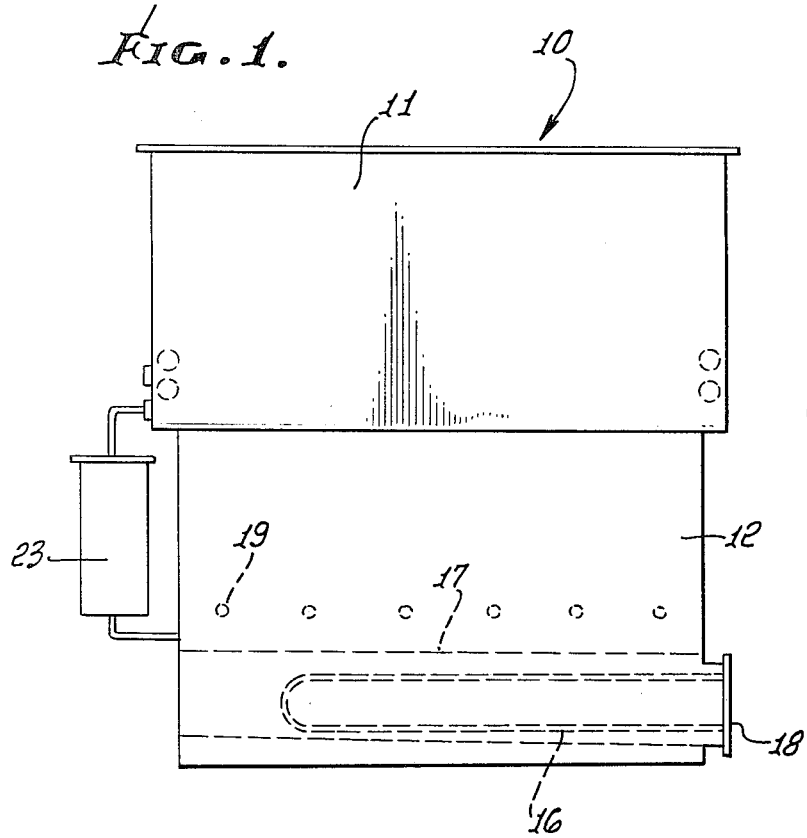
FIG. 1 is a side view of a typical vapor degreaser with which the present invention is designed to be used.
Figure 4:
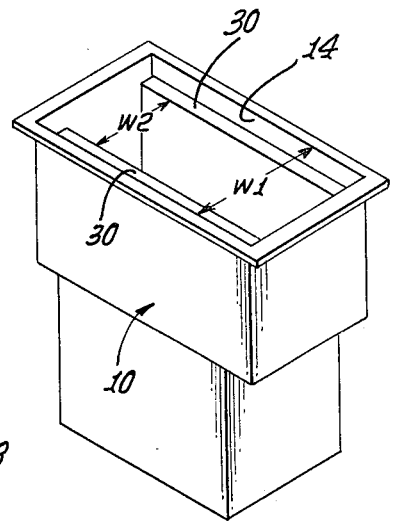
FIG. 4 is a perspective view of the vapor degreaser of FIG. 1 with the presently preferred embodiment of the invention incorporating therein and illustrating the change in freeboard ratio.
Figure 2:
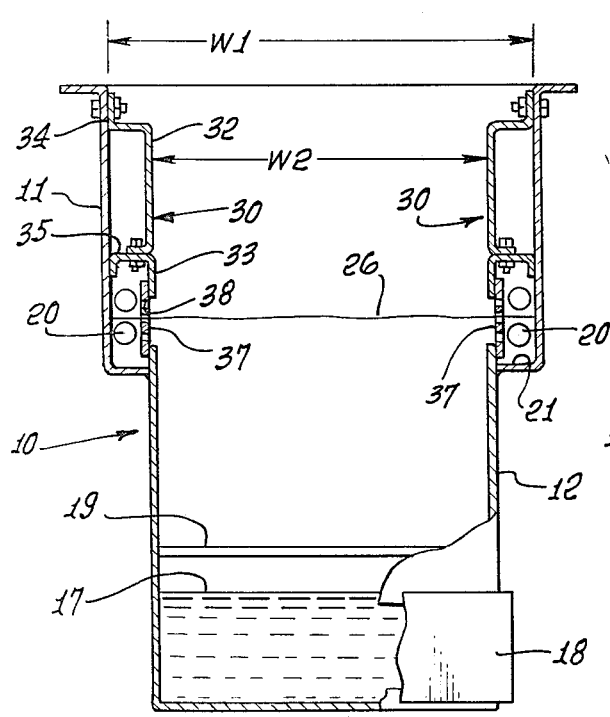
FIG. 2 is an end view of the unit of FIG. 1 partly in section, illustrating installation of the tank insert of the invention in a stepped wall tank.

Referring to FIGS. 1, 2 and 4, the vapor degreaser includes a stepped tank 10 with a larger upper portion 11 and a smaller lower portion 12. The tank has an open top 14 with an inside width W1.

The degreaser itself may be conventional in design and typically includes a heating unit in the bottom which may comprise pipes 16 for circulating steam through liquid solvent, with a liquid level 17. A cover 18 provides access to the heater and the lower portion of the tank for cleaning. Horizontal rods 19 may be mounted above the liquid level 17 for supporting work pieces if desired.

Condensing coils 20 for circulating cooling water are positioned at the inner wall of the tank and in the embodiment illustrated in FIG. 2, the condensing coils are positioned at the lower end of the upper section 11, with the upper end of the lower section 12 projecting upward to define a trough 21 for collecting condensate. Various forms of condensers can be utilized, one alternative configuration comprising a water jacket around the tank for circulating cooling water. The condensate is drawn out from the trough 21 to a water separator 23, with the separated solvent being returned to the bottom of the tank.

In operation, the liquid solvent is heated, producing a vapor which rises in the tank into the work zone between the liquid level 17 and a vapor level 26. The vapor level is produced by condensation of the vapor at the condensing coils, with most of the vapor being collected at this level. However some of the vapor escapes upward through the open top of the tank and the amount of vapor escaping is a function of the freeboard ratio, $D/W1$, where D is the depth between the open tap and the vapor level.

In the present invention, inserts 30 are introduced into the tank at one or both sides, to reduce the width at the freeboard from W1 to W2. In the preferred form for the insert 30 shown in FIG. 2, a first metal channel 32 is attached to a second metal channel 33, as by bolting, to provide a substantially flat insert wall. The insert is attached to the tank 11, typically by bolting a flange 34 to the wall 11. A flange 35 of the channel 33 rests against the wall 11 and serves as a vapor stop and as a spacer. The lower end of the insert, which may be formed intergrally with the channel 33 or separately as a sheet 37, has a plurality of apertures 38 for vapor flow therethrough. This plate 37 may be punched or perforated metal or expanded metal or otherwise as desired. The lower end of the aperture plate 37 preferably extends into the trough 21. Of course, the entire insert could be formed of a single piece of metal if desired.

The inserts 30 extend the full length of the interior of the tank, thereby reducing the width from W1 to W2. The specific tank discussed above with a depth of 16½ inches and a width of 27 inches can be modified to meet present day requirements by installing inserts at each side 3 inches deep, thereby reducing the width to 21 inches and increasing the freeboard ratio to 28%.

The flange 35 serves to space the vertical wall of the insert from the vertical wall of the tank and also functions to block upward flow of vapor between these walls. The flange 34 also performs this same function, and in an alternative construction, only one such spacer and blocking unit is needed. The inserts also function to protect the condensing coils.

Figure 3:
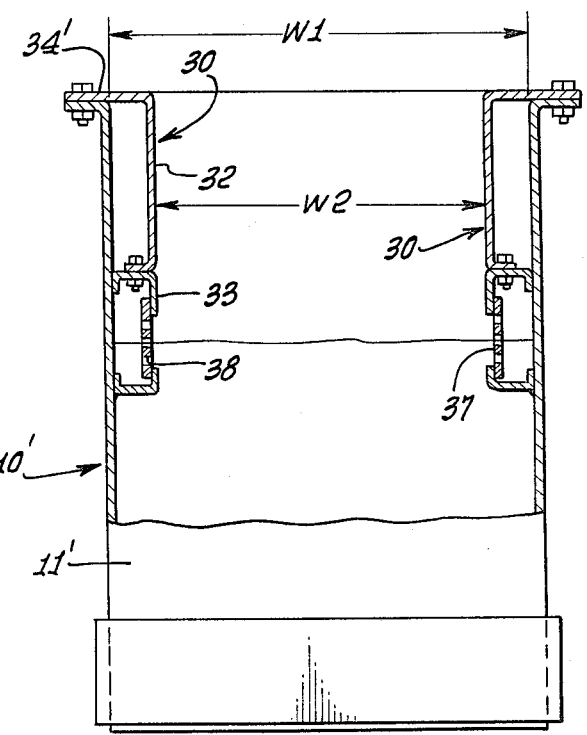
FIG. 3 is a view similar to that of FIG. 2 illustrating an alternative embodiment of the invention and use of the invention with a straight wall tank.

In FIG. 3, the inserts 30, are shown installed in a tank 10′ having straight vertical walls 11′, rather than the stepped walls of the tank of FIGS. 1 and 2. Also the upper flange of the channel 32 overlies the top of the tank, as shown at 34′, this construction being useful where the flange configuration of FIG. 2 results in too small a value for D. Otherwise, the construction and operation are the same as described above.

I claim:

1. In a vapor degreaser having a rectangular tank for a solvent, condensing means at the wall of said tank defining a vapor level with a freeboard between the vapor level and the open top of the tank of depth D and width W, having a fixed design freeboard ratio defined as the ratio of the debth of said tank between said open top and a predetermined vapor level within said tank, to said width W, condensate collecting means for returning condensed solvent vapor to the lower portion of the tank, and means for heating the liquid solvent, the improvement for increasing the tank freeboard depth-to-width ratio D/W and comprising:

means to be inserted into said degreaser, dimensioned for increasing said design freeboard ratio sufficient to satisfy predetermined air pollution control requirements, including, a tank insert mounted within said tank and having a substantially vertical wall extending from adjacent said tank top to said vapor level, spacer means for positioning said insert wall inward from the tank wall reducing the freeboard width W, and stop means positioned between said insert wall and tank wall blocking vapor flow upward between said walls.

2. A vapor degreaser as defined in claim 1 wherein said insert wall projects downward past said condensing means with said insert wall including apertures therein for vapor flow to said condensing means.

3. A vapor degreaser as defined in claim 2 with the lower end of said insert wall positioned in said condensate collecting means.

4. A vapor degreaser as defined in claim 1 having one of said tank inserts at each side.

5. A vapor degreaser as defined in claim 1 wherein said condensate collecting means includes a trough projecting into said tank from the wall thereof, with said insert wall positioned in said trough.

6. A vapor degreaser as defined in claim 1 wherein said tank has a lower smaller portion and an upper larger portion joined at a trough forming a portion of said condensate collecting means, with said insert wall positioned in said trough.

* * * * *